United States Patent [19]

Hostetler

[11] 4,044,963
[45] Aug. 30, 1977

[54] ROUND BALE LOADER, UNLOADER AND UNROLLER

[75] Inventor: Dewey L. Hostetler, Harper, Kans.

[73] Assignee: DewEze Mfg., Inc., Harper, Kans.

[21] Appl. No.: 725,566

[22] Filed: Sept. 22, 1976

[51] Int. Cl.² .................. B65H 75/00; B65H 75/40; B65H 17/46
[52] U.S. Cl. ........................... 242/54 R; 214/147 G; 214/522; 242/86.5 R
[58] Field of Search ............... 242/54 R, 68.4, 86.5 R, 242/86.52, 94; 294/86.24, 88; 214/1 QB, 5, 377, 450, 506, 512, 515, 518–523, 75 R, 58, 147 G, 77

[56] References Cited

U.S. PATENT DOCUMENTS

| 3,625,445 | 12/1971 | Hall | 242/54 R |
| 3,817,567 | 6/1974 | Lull | 294/88 |
| 3,877,595 | 4/1975 | Edelman | 214/506 |
| 3,880,305 | 4/1975 | Van Polen | 214/147 G |
| 3,902,612 | 9/1975 | Hall | 214/77 R |

Primary Examiner—Leonard D. Christian
Attorney, Agent, or Firm—Edwin H. Crabtree; John H. Widdowson

[57] ABSTRACT

A round bale loader, unloader and unroller for mounting on the rear of a flat bed vehicle. The loader grips the sides of a round bale on a ground surface. The bale is rotated by the bale loader in an arc over the rear of the vehicle and places the bale on the bed of the vehicle between the vehicle's cab and the rear of the vehicle. The loader can suspend a round bale above the rear of the vehicle or adjacent the rear of the vehicle. The loader can unroll a round bale by positioning the bale adjacent the ground surface and rolling the bale thereon.

10 Claims, 7 Drawing Figures

ROUND BALE LOADER, UNLOADER AND UNROLLER

BACKGROUND OF THE INVENTION

This invention relates generally to farm equipment used in the handling of bales of hay or the like, and more particularly, but not by way of limitation, to a vehicle mounted loader used in the handling of round bales.

Heretofore there have been a number of different types of bale loading devices used in loading and unloading rectangular shaped bales. More recently a trend in the farming and ranching industry has been to use large round bales for feeding cattle. The large round bales provide a greater amount of feed for animals in the field and the round bales need not be transferred from the field and stored under cover. But because of the size and weight of the round bales they are difficult to move, should it be desired to move the bales to a different location.

With the advent of the large round bales, there have been a number of prior art, bale-handling devides and carriers attached to tractors, trailers and farm vehicles. These devices are operated using hydraulic cylinders for lifting and loading the bales. The prior art lifting devices grip the sides of the round bale and through mechanical linkage, lift the bale into an adjacent vehicle or roll the bale onto the loading vehicle. None of these devices provide a portable bale loader which can be mounted on the rear of a vehicle so that the loader can load and unload the vehicle by lifting the round bale over the rear of the vehicle and on to the flat bed of the vehicle. Also, none of the prior art loaders are capable of suspending a round bale at the rear of the vehicle and unrolling the bale as it contacts the ground surface.

The subject invention provides a novel round bale loader having mechanical structure and advantages not disclosed in the prior art bale loading devices.

SUMMARY OF THE INVENTION

The subject invention provides a simple in design yet ruggedly constructed bale loader for mounting on various types and sizes of flat bed vehicles, trailers, or the like.

The round bale loader is hydraulically operated and eliminates the difficulty of handling round bales. Also, the loader provides means for transporting round bales to various locations where the bales are required for feeding farm animals.

The loader has a single hydraulic cylinder which is used to pivot hugger arms which grip the bale in an arc greater than 90° so that a round bale may be picked up from the ground surface, rotated upwardly, and over the rear of the vehicle onto the flat bed of the vehicle, between the vehicle's cab and the rear of the vehicle.

The loader provides a single hydraulic cylinder for expanding and contracting the width between the hugger arms so that various sizes of round bales can be lifted onto the vehicle.

Also the invention provides means for suspending a round bale adjacent the rear of the vehicle and unrolling the round bale on the ground surface for ease in feeding farm animals in the field.

The loader not only is self-loading and unloading, but can be used for loading other vehicles. The loader can suspend and hold a round bale in place above the vehicle or above and adjacent the rear of the vehicle.

The invention includes a frame attached to the flat bed of the vehicle. Attached to the frame is a lateral cross bar pivotly attached thereto and adjacent the rear of the vehicle. The cross bar includes a first hydraulic cylinder mounted therein and attached to expansion arms slidably mounted in both ends of the cross bar. Attached to the ends of the expansion arms are outwardly extending hugger arms. The hugger arms are positioned adjacent the sides of the round bale, and by contracting the expansion arms, the hugger arms grip the sides of the round bale so that the bale may be lifted into the vehicle. The cross bar and hugger arms are rotated on the frame by a horizontally mounted second hydraulic cylinder attached to the frame and pivotly attached to a push arm. The push arm is attached to a lift arm and pivot arm. The lift arm is attached to the cross bar. The pivot arm is attached to the frame. By rotating the push arm, the lift arm and pivot arm, the cross bar is rotated in an arc greater than 90°, which in turn rotates the hugger arms gripping the round bale, thereby lifting and rotating the round bale from the ground surface onto the flat bed of the vehicle.

The advantages and objects of the invention will become evident from the following detailed description when read in conjunction with the accompanying drawings which illustrate the preferred embodiments of the invention.

DETAILED DESCRIPTION OF THE DRAWINGS

Figure 1:
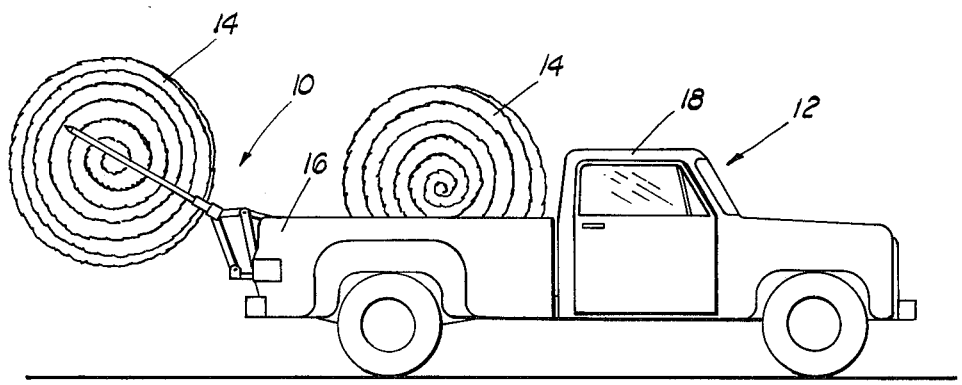
FIG. 1 is a side view of a flat bed vehicle having the round bale loader mounted on the rear of the vehicle with a suspended round bale attached thereto.

In FIG. 1, the round bale loader is designated by general reference numeral 10. The loader 10 is mounted on the floor of the flat bed of a pick-up truck 12. While the truck 12 is shown, it should be appreciated that the loader 10 can be mounted on any type or size of truck, trailer, or the like having a flat bed surface. The truck 12 is shown having a large round bale 14 of hay loaded by the loader 10 onto its bed and disposed between a rear portion 16 of the truck 12 and the trucks cab 18. The loader 10 in this illustration is shown gripping the sides of an additional round bale 14 and suspending the bale 14 adjacent the rear portion 16 of the truck 12.

Figure 2:
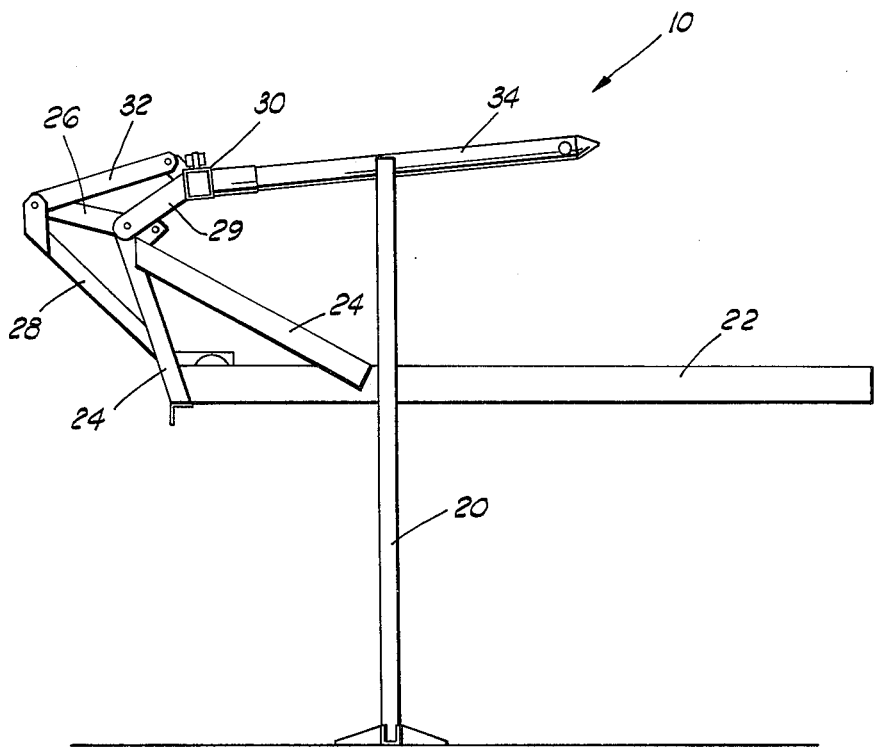
FIG. 2 is a side view of the loader removed from the vehicle and suspended on vertical supports used to store the loader when not in use.

In FIG. 2, the portability of the loader 10 is illustrated wherein the loader 10 is removed from the truck 12 and balanced on a pair of vertical supports 20. The supports 20 are used to store the loader 12 while it is not in use.

Figure 4:
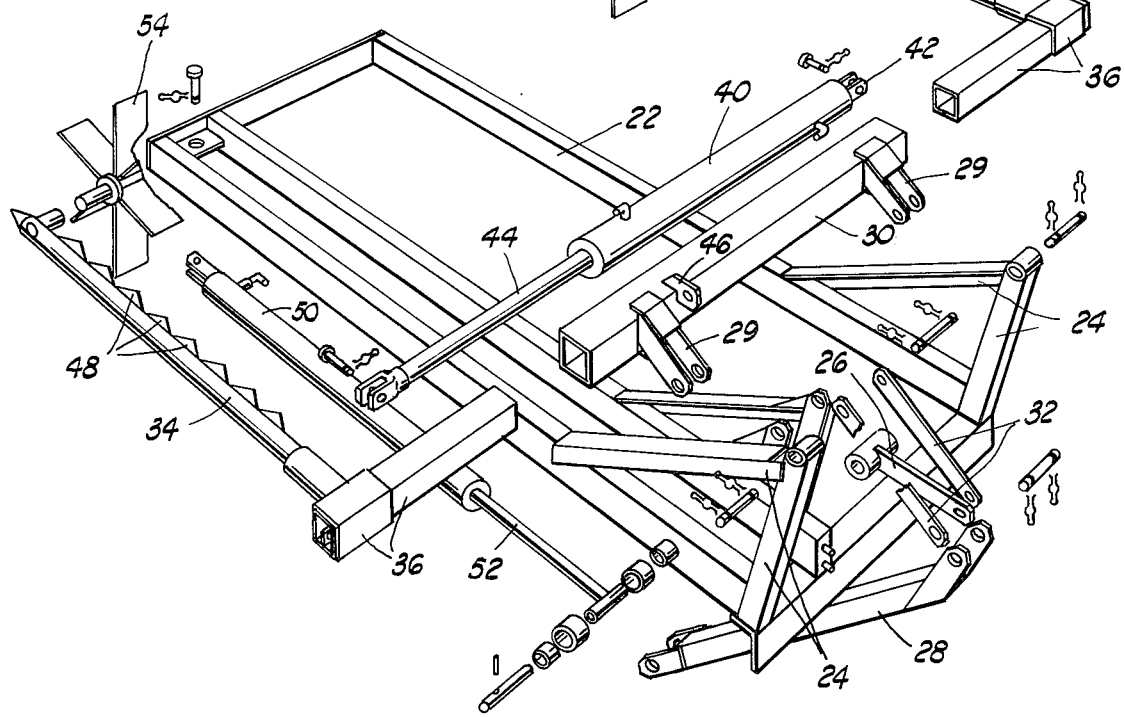
FIG. 4 is a perspective view of the loader illustrating the individual elements making up the loader.

In this figure, a side view of the loader 10 is seen having an elongated horizontal frame 22. The frame 22 is mounted on the floor of the bed of the truck 12. Attached to the rear of the frame 22 and extending upwardly is a frame support 24. At the upper end of the frame support 24, is a pivot arm 26 having one end rotatably mounted to the support 24. The other end of the pivot arm 26 is pivotly attached to one end of a push rod 28. The other end of the push rod 28 is attached to a hydraulic cylinder which is shown in FIG. 4. Also rotatably attached to the upper end of the frame support 24 is a bar brace 29 which is secured to a lateral cross bar 30. A lift arm 32 is rotatably attached at one end to the push rod 28 and pivot arm 26 with the other end attached to the cross bar 30. Extending outwardly and attached to the cross bar 30 is a hugger arm 34.

Figure 3:
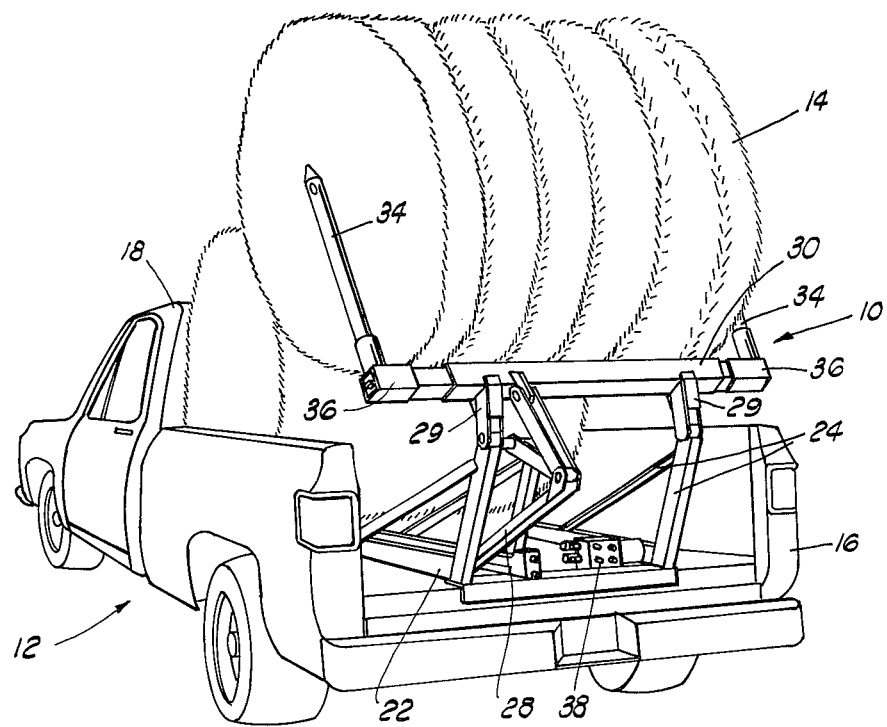
FIG. 3 is a perspective view of the loader mounted on the rear of the vehicle.

In FIG. 3, a rear perspective view of the truck 12 is illustrated with the loader 10 mounted thereon and suspending a bale 14 above the rear portion 16 of the truck 14. In this view, the cross bar 30 can be seen having a pair of slidably mounted extension arms 36 extending outwardly from the ends thereof. A pair of hugger arms 34 are perpendicularly attached to the ends of the extension arms 36.

Also seen in this view, is a hydraulic pump 38 attached to the frame 22. The pump 38 is used for driving the hydraulic cylinders which are part of the loader 10.

In FIG. 4, a perspective view of the loader 10 is illustrated with the individual parts disassembled. In this view, an exploded first hydraulic cylinder 40 can be seen having extendable rams 42 and 44 at either end thereof. The ends of the rams 42 and 44 are pinned to the extension arms 36. The hydraulic cylinder 40 is disposed inside the lateral cross bar 30 in its assembled condition. The cross bar 30 is rotatably mounted on the frame supports 24 by the bar braces 29 and attached by pins and bushings. Also attached to the cross bar 30 is a lift brace 46 for pinning one end of the lift arms 32 thereto.

The hugger arms 34 are seen having metal teeth 48. The teeth 48 provide gripping means when the extension arms 36 are contracted by the cylinder 40 and the hugger arms 34 engage the sides of the round bale 14. By activating the cylinder 40, the extension arms 36 adjust the width between the hugger arms 34 so that round bales of various sizes and widths may be loaded.

A second hydraulic cylinder 50 is attached at one end of the frame 22 by a pin. The second hydraulic cylinder 50 includes a ram 52 which when activated expands outwardly along the length of the frame 22. The ram 52 is attached to one end of the push rod 28 by a pin and bushings. As a ram 52 is extended outwardly and horizontally, the push arm 28 is urged upwardly and outwardly with the upper end of the push arm 28 pivoting toward the front of the truck 12. As the push arm 28 rotates, lift arms 32 rotate the cross bar 30 from a position at the rear of the truck 12 upwardly and forwardly toward the front of the truck 12.

The second hydraulic cylinder 50 in combination with the push arm 28, pivot arm 26 and lift arms 32, provide a mechanical linkage which allows the hugger arms 34 to rotate the round bale 14 in an arc greater than 90° and upwardly toward an arc of approximately 220°, thereby providing the necessary rotation so that a round bale 14 may be lifted from the ground surface, rotated above the rear of the vehicle, and loaded onto the flat bed of the truck 12.

An additional feature of the loader 10 is the provision of metal spinners 54. These spinners 54 are rotatably attached by a shaft inserted into a bushing at the ends of the hugger arms 34. When using the spinners 54 with the hugger arms 34, the spinners 54 contact the sides of the round bale 14 and compress the bale 14 therebetween. The round bale 14 is lifted above the ground surface so that the weight of the round bale 14 no longer bears on the ground surface. At this point, the vehicle is driven slowly along the ground surface with the round surface of the bale 14 contacting the ground and the bale 14 rotates on the spinners 54, thereby unrolling the bale 14.

Figure 5:
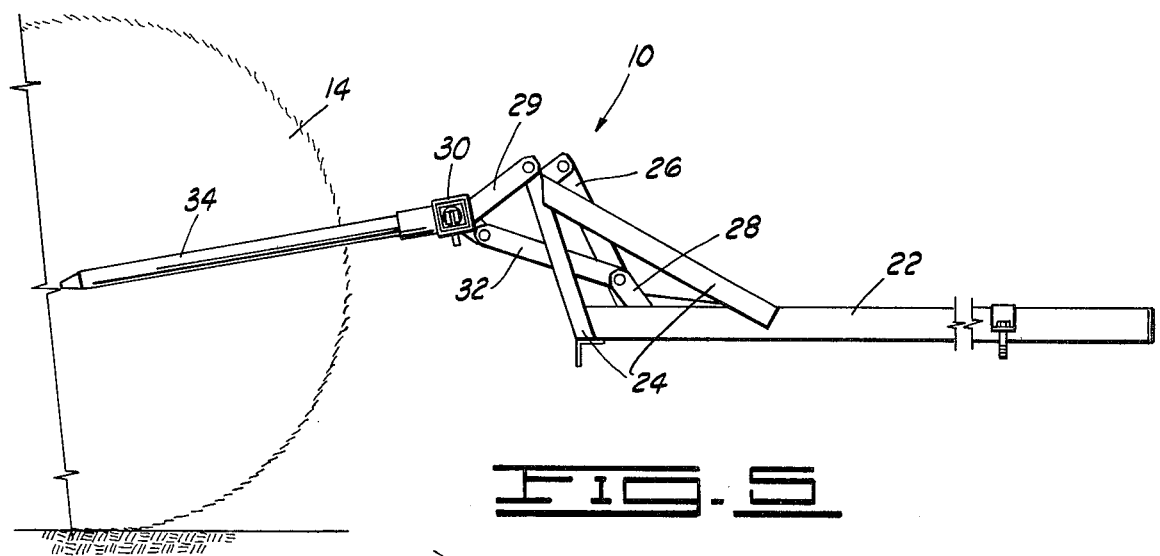
FIG. 5 is a side view of the loader in a position ready to lift a round bale from the ground surface.

In FIG. 5, a side view of the loader 10 is illustrated with the cross bar 30 disposed at the rear of the frame supports 24 and the hugger arms 34 disposed around a round bale 14 resting on the ground surface. In this position, the push arm 28 is in a fully retracted position with the lift arm 32 and pivot arm 26 extending downwardly.

Figure 6:
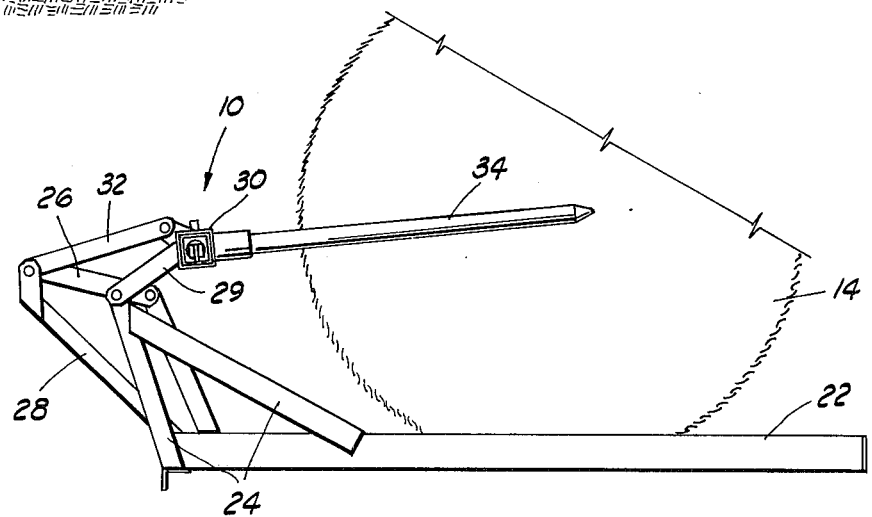
FIG. 6 is a side view of the loader wherein the loader has rotated the round bale onto the flat bed of the vehicle.

In FIG. 6, the second hydraulic cylinder 50 has been activated urging the push rod 28 outwardly and upwardly thereby rotating the lift arm 32 and pivot arm 26 upwardly. The cross bar 30 has been rotated forward of the frame supports 24 and the hugger arms 34 have loaded the bale 14 on the truck 12.

Figure 7:
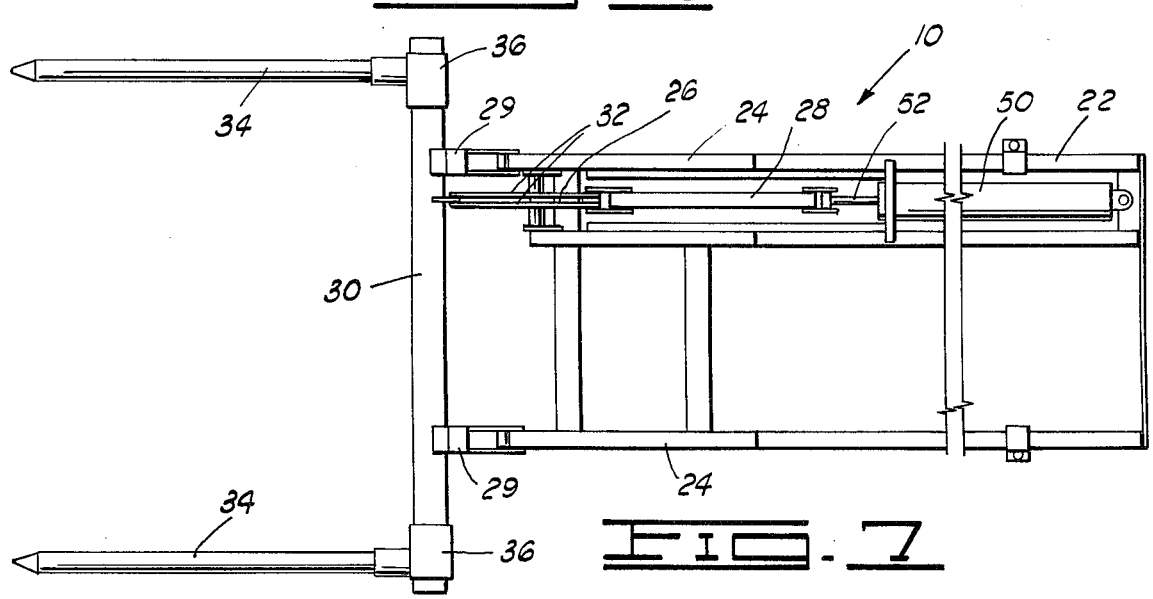
FIG. 7 is a top view of the loader.

In FIG. 7, a top view of the loader 10 is illustrated. In this view, the hugger arms 34 can be seen without the teeth 48 and extending outwardly from the rear of the frame 22. The first hydraulic cylinder 40 disposed inside the cross bar 30 has retracted and the extension arms 36 are adjacent the ends of the cross bar 30. The second hydraulic cylinder 50 is seen with the ram 52 in a retracted position.

Changes may be made in the construction and arrangements of the parts or elements of the embodiments as disclosed herein without departing from the spirit or scope of the invention as defined in the following claims.

I claim:

1. A round bale loader, unloader and unroller for mounting on the rear of a flat bed vehicle, the loader comprising:
    a frame attached to the flat bed of the vehicle;
    a lateral cross bar pivotly attached to said frame, said cross bar parallel to the rear of the vehicle and adjacent thereto;
    expansion means attached to said cross bar for expanding and contracting the length of said cross bar;
    hugger arms attached to the ends of said cross bar and extending outwardly therefrom, said hugger arms disposed adjacent the sides of a round bale and gripping the sides thereof when said cross bar is contracted; and
    pivot means attached to said cross bar and said frame for pivoting said cross bar on said frame for loading and unloading a round bale.

2. The loader as described in claim 1, wherein said expansion means includes a first hydraulic cylinder mounted inside said cross bar.

3. The loader as described in claim 2, wherein said cross bar further includes expansion arms slidably mounted inside the ends of said cross bar, said expansion arms attached at one end to said first hydraulic cylinder, the other end of said expansion arms attached to said hugger arms.

4. The loader as described in claim 1, wherein said pivot means includes a second hydraulic cylinder attached at one end to said frame, the other end of said hydraulic cylinder attached to a push arm, said push arm pivotly attached to a pivot arm and a lift arm, said lift arm pivotly attached to said cross bar, said pivot arm pivotly attached to said frame, said second hydraulic cylinder when actuated rotating said push arm, said pivot arm and said lift arm for rotating said cross bar on said frame.

5. A round bale loader, unloader, and unroller for mounting on the rear of a flat bed vehicle, the loader comprising:
   a frame attached to the flat bed of the vehicle;
   a lateral cross bar pivotly attached to said frame, said cross bar having expansion arms slidably mounted inside the ends of said cross bar, said cross bar parallel to the rear of the vehicle and adjacent thereto;
   a first hydraulic cylinder mounted inside said cross bar and attached to one end of said expansion arms;
   hugger arms attached to the other ends of said expansion arms and perpendicular thereto, said hugger arms extending outwardly therefrom and disposed adjacent the sides of a round bale and gripping the sides thereof when said expansion arms are contracted into said cross bar;
   a second hydraulic cylinder attached at one end to said frame;
   a push arm pivotly attached to the other end of said second hydraulic cylinder, the other end of said push arm pivotly attached to a pivot arm and a lift arm, said lift arm pivotly attached to said cross bar, said pivot arm pivotly attached to said frame, said second hydraulic cylinder when actuated rotating said push arm, said pivot arm and and said lift arm for rotating said cross bar on said frame.

6. The loader as described in claim 5, wherein said cross bar is rotated on said frame in an arc greater than 90° when said second hydraulic cylinder is actuated so that a round bale may be loaded from the ground surface, lifted over the rear of the vehicle, and onto the flat bed of the vehicle.

7. The loader as described in claim 5, wherein said second hydraulic cylinder is positioned horizontally along the length of the flat bed of the truck and parallel thereto.

8. The loader as described in claim 7, wherein said second hydraulic cylinder when actuated rotates said push arm upwardly and rearwardly toward the rear of the vehicle, said push arm rotating said lift arm, said pivot arm and said cross bar from a position adjacent the rear of the vehicle upward and forwardly toward the fromt of the vehicle.

9. The loader as described in claim 5, wherein said hugger arms include teeth attached along the length thereof to aid in securing the round bale.

10. The loader as described in claim 5, wherein said hugger arms further include rotatable spinners attached to the ends thereof, said spinners contacting the sides of a round bale and rotating the bale on the loader so that the bale may be unrolled on the ground surface.

* * * * *

UNITED STATES PATENT OFFICE
CERTIFICATE OF CORRECTION

Patent No. 4,044,963    Dated August 30, 1977

Inventor(s) Dewey L. Hostetler

It is certified that error appears in the above-identified patent and that said Letters Patent are hereby corrected as shown below:

Column 6, line 19, "fromt" should read -- front --.

Signed and Sealed this

Seventh Day of March 1978

[SEAL]

Attest:

RUTH C. MASON
Attesting Officer

LUTRELLE F. PARKER
Acting Commissioner of Patents and Trademarks